US012279924B2

(12) United States Patent
Li et al.

(10) Patent No.: US 12,279,924 B2
(45) Date of Patent: Apr. 22, 2025

(54) SHELL-SHAPED TOOTH REPOSITIONER

(71) Applicant: WUXI EA BIOTECHNOLOGY LIMITED, Wuxi (CN)

(72) Inventors: Junsheng Li, Shanghai (CN); Ketuo Zhou, Shanghai (CN); Lei Huang, Shanghai (CN)

(73) Assignee: WUXI EA BIOTECHNOLOGY LIMITED, Wuxi (CN)

( * ) Notice: Subject to any disclaimer, the term of this patent is extended or adjusted under 35 U.S.C. 154(b) by 3 days.

(21) Appl. No.: 17/766,756

(22) PCT Filed: Jul. 23, 2020

(86) PCT No.: PCT/CN2020/103759
§ 371 (c)(1),
(2) Date: Apr. 6, 2022

(87) PCT Pub. No.: WO2021/068597
PCT Pub. Date: Apr. 15, 2021

(65) Prior Publication Data
US 2024/0090976 A1 Mar. 21, 2024

(30) Foreign Application Priority Data
Oct. 10, 2019 (CN) .......................... 201921685369.5

(51) Int. Cl.
*A61C 7/08* (2006.01)
(52) U.S. Cl.
CPC ..................................... *A61C 7/08* (2013.01)
(58) Field of Classification Search
CPC ................................... A61C 7/08; A61C 7/36
(Continued)

(56) References Cited

U.S. PATENT DOCUMENTS 3,939,598 A * 2/1976 Bergersen ................ A61C 7/08
433/6
6,364,659 B1 * 4/2002 Lotte ....................... A61C 7/00
433/18
(Continued)

FOREIGN PATENT DOCUMENTS

| CN | 102159153 A | 8/2011 |
| CN | 106456286 A | 2/2017 |
| CN | 107088101 A | 8/2017 |

OTHER PUBLICATIONS

International Search Report of the International Searching Authority issued to International Application No. PCT/CN2020/103759, dated Nov. 3, 2020.

*Primary Examiner* — Matthew M Nelson
(74) *Attorney, Agent, or Firm* — MARSHALL, GERSTEIN & BORUN LLP; Michael P. Furmanek

(57) ABSTRACT

In one aspect of the present application, a shell-shaped tooth repositioner is provided, it comprises: N successive shell-shaped tooth repositioners corresponding to N successive steps, respectively, where each of the N shell-shaped tooth repositioners is for repositioning teeth from an initial tooth arrangement of a corresponding step to a target tooth arrangement of the corresponding step, where a first bite plate is provided on a lingual side of a portion corresponding to a first tooth of each of the N shell-shaped tooth repositioners, for opening bite of anterior teeth, where relative positions between the first bite plates on the N shell-shaped tooth repositioners and the first tooth are such that each of the N shell-shaped tooth repositioners is able to open bite of the anterior teeth to an extent that is substantially consistent with a target extent, where N is a natural number greater than 3.

20 Claims, 2 Drawing Sheets

(58) Field of Classification Search
USPC ............................................................ 433/6
See application file for complete search history.

(56) References Cited

U.S. PATENT DOCUMENTS

| | | | |
|---|---|---|---|
| 6,505,625 B1* | 1/2003 | Uenishi | A61C 7/08 128/859 |
| 2015/0238283 A1* | 8/2015 | Tanugula | A61C 7/36 700/98 |
| 2016/0106521 A1* | 4/2016 | Tanugula | A61C 7/36 433/6 |
| 2018/0000564 A1* | 1/2018 | Cam | A61C 7/08 |
| 2018/0078342 A1* | 3/2018 | Gardner | A61C 7/36 |
| 2019/0000592 A1* | 1/2019 | Cam | A61C 9/0046 |
| 2019/0029775 A1* | 1/2019 | Morton | A61C 7/08 |
| 2019/0125494 A1* | 5/2019 | Li | A61C 7/36 |
| 2019/0125497 A1* | 5/2019 | Derakhshan | A61C 7/002 |
| 2019/0255778 A1* | 8/2019 | Lucas | G05B 19/4099 |
| 2019/0282338 A1* | 9/2019 | Tanugula | A61C 7/002 |
| 2019/0290399 A1* | 9/2019 | Boronkay | G05B 19/042 |
| 2020/0000625 A1* | 1/2020 | Robichaud | A61F 5/566 |
| 2020/0237479 A1* | 7/2020 | Zhou | A61C 7/08 |

\* cited by examiner

SHELL-SHAPED TOOTH REPOSITIONER

CROSS-REFERENCE TO RELATED APPLICATIONS

This is the United States national phase of International Patent Application No. PCT/CN2020/103759, filed Jul. 23, 2020, which claims priority to CN 201921685369.5, filed Oct. 10, 2019, the entire contents of each of which are hereby incorporated by reference herein.

FIELD OF THE APPLICATION

The present application generally relates to a shell-shaped tooth repositioner, and particularly to a shell-shaped tooth repositioner having a bite plate.

BACKGROUND

Shell-shaped tooth repositioners (e.g., invisible repositioners) made of polymer materials become more and more popular due to their advantages on aesthetic appearance, convenience and hygiene.

An orthodontic treatment using shell-shaped tooth repositioners usually requires a plurality of successive shell-shaped tooth repositioners, for example, more than 20 repositioners or even more than 40 repositioners. In some cases, anterior teeth of upper and lower jaws need to be kept apart in a certain stage of an orthodontic treatment, and accordingly, bite plates need to be provided on a plurality of successive shell-shaped tooth repositioners corresponding to the stage.

Conventionally, positions of bite plates on shell-shaped tooth repositioners are manually determined, and relative positions between the bite plates on these successive shell-shaped tooth repositioners and corresponding teeth remain unchanged. After extensive research, the Inventors discovered that this might cause the following problems: first, as a tooth provided with a bite plate and/or its opposing tooth move, the open extent of bite of anterior teeth might change, instead of being kept at a target extent, and this might result in an adverse effect on the orthodontic treatment; secondly, it is desirable that a contact surface of a bite plate remain perpendicular to the long axes of an opposing tooth, to prevent teeth of the opposite jaw from moving in a labio-lingual direction due to the bite plate. However, due to the above reasons, in the conventional solution, it cannot be ensured that each of the bite plates on these successive shell-shaped tooth repositioners is perpendicular to the long axes of the opposing tooth.

In addition, the Inventors of the present application further discovered that mechanical strength of conventional bite plates is not strong enough because of their structures so that they are prone to break.

In view of the above, it is necessary to provide a new shell-shaped tooth repositioner.

SUMMARY

In one aspect, the present application provides a shell-shaped tooth repositioner, which comprises: N successive shell-shaped tooth repositioners corresponding to N successive steps, respectively, where each of the N shell-shaped tooth repositioners is for repositioning teeth from an initial tooth arrangement of a corresponding step to a target tooth arrangement of the corresponding step, where a first bite plate is provided on lingual side of a portion corresponding to a first tooth of each of the N shell-shaped tooth repositioners, for opening bite of anterior teeth, where relative positions between the first bite plates on the N shell-shaped tooth repositioners and the first tooth are such that each of the N shell-shaped tooth repositioners is able to open bite of anterior teeth to an extent which is substantially consistent with a target extent, where N is a natural number greater than 3.

In some embodiments, the relative positions between the first bite plates on the N shell-shaped tooth repositioners and the first tooth may be such that contact surfaces of the first bite plates on the N shell-shaped tooth repositioners may be substantially perpendicular to a long axes of a tooth that opposes the first tooth.

In some embodiments, the relative positions between the first bite plates on the N shell-shaped tooth repositioners and the first tooth may vary with the positions of the first tooth and the tooth that opposes the first tooth, such that each of the N shell-shaped tooth repositioners is able to open bite of anterior teeth to the extent which is substantially consistent with the target extent, and the contact surfaces of the first bite plates on the N shell-shaped tooth repositioners is substantially perpendicular to the long axes of the tooth that opposes the first tooth.

In some embodiments, size of the first bite plates on the N shell-shaped tooth repositioners may be a minimum size on the premise that preset requirements are satisfied.

In some embodiments, each of the first bite plates may narrow gradually from the contact surface to the other end.

In some embodiments, each of the N shell-shaped tooth repositioners may be an integral shell.

In some embodiments, among the N successive steps, an initial tooth arrangement of the $M^{th}$ step may be identical with an target tooth arrangement of the $M-1^{th}$ step, and an target tooth arrangement of the $M^{th}$ step may be identical with an initial tooth arrangement of the $M+1^{th}$ step, where M is smaller than N.

In some embodiments, the N shell-shaped tooth repositioners may be upper jaw repositoiners.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are necessarily drawn to scale, and like reference numbers therein denote like components.

DETAILED DESCRIPTION OF ILLUSTRATED EMBODIMENTS

Figure 1:
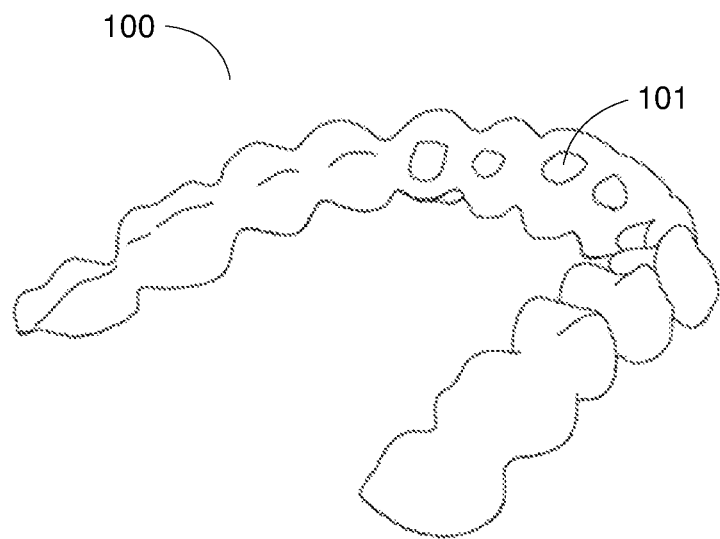
FIG. 1 schematically illustrates a shell-shaped tooth repositioner in one embodiment of the present application.

In the following detailed depiction, reference is made to the accompany drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which fall within the scope of the present application.

An orthodontic treatment using shell-shaped tooth repositioners is divided into N successive steps, each step corresponds to a shell-shaped tooth repositioner for repositioning teeth from an initial tooth arrangement of the step to a target tooth arrangement of the step. Substantially, an initial tooth arrangement of the $M^{th}$ step is a target tooth arrangement of the $M-1^{th}$ step, and a target tooth arrangement of the $M^{th}$ step is an initial tooth arrangement of the $M+1^{th}$ step.

In some cases, bite of anterior teeth needs to be opened throughout the whole process or at least during a certain phase of an orthodontic treatment, and bite plates need to be provided on corresponding shell-shaped tooth repositioners. Usually, bite plates are provided on lingual side of a portion corresponding to anterior teeth of upper jaw shell-shaped tooth repositioners so that in the occlusal state, lower jaw anterior teeth abut against contact surfaces of corresponding bite plates, thereby open bite of the anterior teeth.

Currently, a most commonly-used method of fabricating shell-shaped tooth repositioner is thermo forming process. In a conventional solution, to fabricate a shell-shaped tooth repositioner having a bite plate, usually the bite plate is manually added on a 3D digital model of teeth, and then based on the 3D digital model of the teeth with the bite plate thereon, a series of successive 3D digital models of the teeth respectively corresponding to a series of successive tooth arrangements are obtained by teeth movement path planning. Then, a series of successive positive models of teeth are fabricated using the series of successive 3D digital models of the teeth. After that, a series of successive shell-shaped tooth repositioners having the bite plate are obtained by thermo forming on the series of successive positive models of the teeth.

That is to say, in the conventional solution, relative positions between the bite plate on the series of successive shell-shaped tooth repositioners and the tooth provided with the bite plate are consistent. However, during the orthodontic treatment, positions of the tooth provided with the bite plate and the tooth it opposes might change with the orthodontic treatment, and this might cause the aforesaid problems: (1) as the tooth provided with the bite plate and/or its opposing tooth move, when different shell-shaped tooth repositioners are worn, the extent to which bite of the anterior teeth is opened might vary, i.e., it may be inconsistent with a target extent; (2) as the tooth provided with the bite plate and/or its opposing tooth move, it can not be ensured that when each shell-shaped tooth repositioner is worn, the contact surface of the bite plate is substantially perpendicular to a long axis of the opposing tooth.

After extensive research, the Inventors of the present application developed a new shell-shaped tooth repositioner, which includes a plurality of successive shell-shaped tooth repositioners, where a first bite plate is provided on a lingual side of a portion corresponding to a first tooth of each shell-shaped tooth repositioner, where the first bite plates are positioned on these shell-shaped tooth repositioners such that when any of these shell-shaped tooth repositioners is worn, bite of anterior teeth is opened to an extent which is substantially consistent with a target extent, and contact surface of each of the first bite plates is substantially perpendicular to the long axis of an opposing tooth. Inspired by the present application, it is understood that as an orthodontic treatment proceeds, positions of the first tooth and its opposing tooth might change, and relative positions between the first bite plates on different shell-shaped tooth repositioners and the first tooth might be different so that the first bite plates can achieve the above effect.

In another aspect, the Inventors of the present application further discovered that the smaller size of a bite plate, the higher wearing comfort, and the more uniform thickness distribution of a shell-shaped tooth repositioner fabricated by thermo forming process, particularly thickness distribution at the bite plate.

In one embodiment, the dimensions of a bite plate may be defined in such a way that the dimension of the contact surface of the bite plate in labial-lingual direction is the length of the bite plate, the dimension of the contact surface of the bite plate in mesial-distal direction is the width of the bite plate, and the dimension between the contact surface of the bite plate and its opposing end is the height the bite plate.

In one embodiment, on the premise that requirements are satisfied, the size of a bite plate including at least one of the length, the width and the height, is reduced as much as possible. In one embodiment, the requirements are as follows: the length is sufficient to enable the incisal end of the opposing tooth to abut against the contact surface of the bite plate in the occlusal state; the height is sufficient to ensure the mechanical strength of the bite plate; the width is sufficient to enable the incisal end of the opposing tooth to abut against the contact surface of the bite plate.

Since positions of teeth change with an orthodontic treatment, minimum dimensions of a bite plate for different shell-shaped tooth repositioners that meet the requirements may vary. The dimensions of a first bite plate on a series of successive shell-shaped tooth repositioners might change, for example, their dimensions may be minimum dimensions meeting the requirements. Inspired by the present application, it is understood that the minimum dimensions meeting the requirements may be manually preset.

In one embodiment, the dimensions of a bite plate may be adjusted according to the following rules.

In one embodiment, a range of 2 mm≤W<10 mm may be set for the width W of bite plate. If W is not within the range, it is believed that the bite plate does not meet requirements of fabrication process and/or mechanical strength requirements (if this dimension is too small, it might make thermo forming difficult; if this dimension is too large, the overall mechanical strength will be reduced and the bite plate is prone to damage under biting force). A range of 0.5 mm≤L≤5.5 mm may be set for the length L of bite plate. If L is not in the range, it is believed that the bite plate does not meet requirements of fabrication process and/or mechanical strength requirements.

In one embodiment, the width W of a bite plate may be set to 3.5 mm by default, and then it can be adjusted according to specific situations so that the bite plate fully covers the width of the incisal end of the opposing tooth and prevent the bite plate from colliding or interfering with other teeth in the opposite jaw.

The height H of the bite plate may be adjusted according to the following rules:

When $2 \text{ mm} \leq W < 3 \text{ mm}$,

-continued $$H = \begin{cases} 3.2, & 0.0 \le L < 2.0 \\ 3.2 + 0.15*L, & 2.0 \le L < 4.0 \\ 3.2 + 0.25*L, & 4.0 \le L \le 5.5 \end{cases}$$

When $3 \text{ mm} \le W < 5 \text{ mm}$, $$H = \begin{cases} 3.2, & 0.0 \le L < 2.0 \\ 3.2 + 0.25*L, & 2.0 \le L < 4.0 \\ 3.2 + 0.4*L, & 4.0 \le L \le 5.5 \end{cases}$$

When $5 \text{ mm} \le W < 10 \text{ mm}$, $$H = \begin{cases} 3.2, & 0.0 \le L < 2.0 \\ 3.2 + 0.3*L, & 2.0 \le L < 4.0 \\ 3.2 + 0.5*L, & 4.0 \le L \le 5.5 \end{cases}$$

In an exemplary embodiment, bite plates are added on 3-3 of an upper jaw shell-shaped tooth repositioner according to the above rules. It may be determined based on distances between upper jaw teeth and lower jaw teeth in the occlusal state that the six bite plates are respectively located 0.45 mm, 0.47 mm, 0.5 mm, 0.48 mm, 0.53 mm and 0.55 mm from the incisal ends of corresponding teeth, the lengths of the six bite plates are respectively 4.2 mm, 4.3 mm, 4.5 mm, 4.8 mm, 4.0 mm and 4.7 mm, the heights of the six bite plates are respectively 4.25 mm, 4.275 mm, 4.325 mm, 4.4 mm, 4.2 mm and 4.375 mm as calculated, and the widths of the six bite plates are respectively 3.5 mm, 3.5 mm, 3.5 mm, 3.5 mm, 3.5 mm and 3.5 mm as calculated.

Referring to FIG. 1, it schematically illustrates a shell-shaped tooth repositioner 100 in the present embodiment, which is an integral shell and forms a cavity for receiving teeth, where the geometry of the cavity is such that it enables the shell-shaped tooth repositioner 100 to reposition teeth from a first tooth arrangement to a second tooth arrangement. The shell-shaped tooth repositioner 100 is integrally formed with six bite plates 101 respectively located on the lingual side of six anterior teeth.

Inspired by the present application, it is understood that the above rules for determining dimensions of a bite plate are only exemplary and may be modified according to specific situations and different theories.

In some cases, it is necessary to open bite of anterior teeth to a specific extent throughout the whole process of an orthodontic treatment; in further cases, it is necessary to open bite of anterior teeth to a specific extent only during a certain stage of an orthodontic treatment; in further cases, it is necessary to open bite of anterior teeth to different extents during different stages of an orthodontic treatment. It is understood that the shell-shaped tooth repositioner of the present application can be used in any of these different cases.

It is understood that different numbers of bite plates, e.g., one, two, three, four, five, six or the like, may be provided according to different demands and specific situations.

A method for fabricating shell-shaped tooth repositioner in one embodiment of the present application will be briefly described below based on an example of a plurality of successive shell-shaped tooth repositioners for opening bite of anterior teeth during a stage of an orthodontic treatment.

First, segmented 3D digital models of upper jaw teeth and lower jaw teeth (teeth can be moved individually) are obtained.

Then, a series of successive 3D digital models of the upper jaw teeth are obtained by teeth movement path planning, which respectively correspond to a series of successive tooth arrangements of the upper jaw teeth, and a series of successive 3D digital models of the lower jaw teeth are obtained by the teeth movement path planning as well, which respectively correspond to a series of successive tooth arrangements of the lower jaw teeth. Teeth movement path planning is a process of designing an orthodontic treatment. In one embodiment, interpolation may be performed based on a digital data set representing an initial tooth arrangement and a target tooth arrangement to obtain a series of successive 3D digital models of teeth, which respectively correspond to a series of successive tooth arrangements.

Then, a series of successive 3D digital models of the upper jaw teeth and a series of successive 3D digital models of the lower jaw teeth corresponding to the stage of the orthodontic treatment that requires bite of the anterior teeth to be opened are identified. After that, paired 3D digital models of the upper jaw teeth and lower jaw teeth are positioned such that bite of the anterior teeth is opened to a target extent. Then, 3D digital models of bite plates are added on the lingual sides of the anterior teeth selected on the 3D digital models of the upper jaw teeth such that the distances between contact surfaces of the bite plates and corresponding opposing teeth are substantially equal to a predetermined distance (e.g., twice the thickness of a shell-shaped tooth repositioner), and the contact surfaces of the bite plates are substantially perpendicular to the long axes of the corresponding opposing teeth.

Then, an apparatus (e.g., a stereo lithography apparatus) is controlled using the 3D digital models having the bite plates thereon to fabricate positive models of the teeth, and finally, form shell-shaped tooth repositioners with the bite plates over the positive models of the teeth, respectively, by thermo forming process.

Inspired by the present application, it is understood that besides thermo forming process, other methods may also be used to fabricate shell-shaped tooth repositioners of the present application, for example, directly fabricate shell-shaped tooth repositioners by a 3D printing method.

Figure 2:
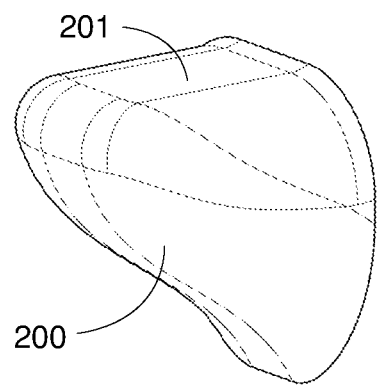
FIG. 2 schematically illustrates a bite plate in one embodiment of the present application.
Figure 3:
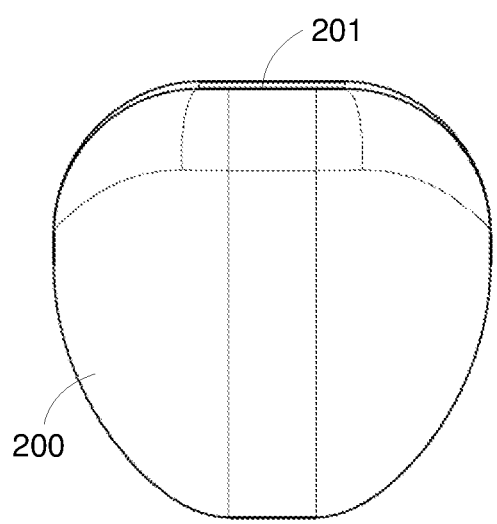
FIG. 3 schematically illustrates a front view of the bite plate shown in FIG. 2.

A further aspect of the present application provides a bite plate with further improved structure. Referring to FIG. 2, it schematically illustrates a bite plate 200 in one embodiment of the present application. Referring to FIG. 3, it schematically illustrates a front view of the bite plate 200 shown in FIG. 2.

The width of the bite plate 200 narrows gradually from the contact surface 201 (top end) to the opposite end (bottom end). The Inventors of the present application discovered after extensive that on the one hand, such a structure can increase the mechanical strength of the bite plate (is able to bear a larger pressure from an opposing tooth); on the other hand, such structure makes thickness distribution of a shell-shaped tooth repositioner fabricated by thermo forming process more uniform, particularly at the bite plate, which makes the overall mechanical performance of the shell-shaped tooth repositioner better.

Inspired by the present application, it is understood that the shell-shaped body and bite plate(s) of a shell-shaped tooth repositioner of the present application may be fabricated separately, and then the bite plate(s) may be bonded by glue or welding onto a corresponding position of the shell-shaped body using a robot.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

We claim:

1. A shell-shaped tooth repositioner comprising: N successive shell-shaped tooth repositioners corresponding to N successive steps, respectively, wherein each of the N shell-shaped tooth repositioners is for repositioning teeth from an initial tooth arrangement of a corresponding step to a target tooth arrangement of the corresponding step, a first bite plate is provided on a lingual side of a portion corresponding to a first tooth of each of the N shell-shaped tooth repositioners, for opening bite of anterior teeth, and wherein relative positions between the first bite plates on the N shell-shaped tooth repositioners and the first tooth are such that each of the N successive shell-shaped tooth repositioners is able to open bite of the anterior teeth to an extent which is substantially consistent with a same target extent, where N is a natural number greater than 3.

2. The shell-shaped tooth repositioner of claim 1, wherein the relative positions between the first bite plates on the N shell-shaped tooth repositioners and the first tooth are such that contact surfaces of the first bite plates on the N shell-shaped tooth repositioners are substantially perpendicular to the long axes of a tooth that opposes the first tooth.

3. The shell-shaped tooth repositioner of claim 2, wherein the relative positions between the first bite plates on the N shell-shaped tooth repositioners and the first teeth vary with positions of the first tooth and its opposing tooth such that each of the N shell-shaped tooth repositioners is able to open bite of the anterior teeth to the extent which is substantially consistent with the target extent, and the contact surfaces of the first bite plates on the N shell-shaped tooth repositioners are substantially perpendicular to the long axes of the tooth that opposes the first tooth.

4. The shell-shaped tooth repositioner of claim 3, wherein dimensions of the first bite plates on the N shell-shaped tooth repositioners include a width in a range between 2 mm and 10 mm and a length in a range between 0.5 mm and 5.5 mm.

5. The shell-shaped tooth repositioner of claim 4, wherein each of the first bite plates narrows gradually from its contact surface to the other end.

6. The shell-shaped tooth repositioner of claim 5, wherein each of the N shell-shaped tooth repositioners is an integral shell.

7. The shell-shaped tooth repositioner of claim 6, wherein among the N successive steps, an initial tooth arrangement of the $M^{th}$ step is identical with an target tooth arrangement of the $M-1^{th}$ step, and an target tooth arrangement of the $M^{th}$ step is identical with an initial tooth arrangement of the $M+1^{th}$ step, where M is smaller than N.

8. The shell-shaped tooth repositioner of claim 7, wherein the N shell-shaped tooth repositioners are upper jaw repositioners.

9. The shell-shaped tooth repositioner of claim 4, wherein each of the N shell-shaped tooth repositioners is an integral shell.

10. The shell-shaped tooth repositioner of claim 9, wherein among the N successive steps, an initial tooth arrangement of the $M^{th}$ step is identical with an target tooth arrangement of the $M-1^{th}$ step, and an target tooth arrangement of the $M^{th}$ step is identical with an initial tooth arrangement of the $M+1^{th}$ step, where M is smaller than N.

11. The shell-shaped tooth repositioner of claim 10, wherein the N shell-shaped tooth repositioners are upper jaw repositioners.

12. The shell-shaped tooth repositioner of claim 3, wherein each of the N shell-shaped tooth repositioners is an integral shell.

13. The shell-shaped tooth repositioner of claim 12, wherein among the N successive steps, an initial tooth arrangement of the $M^{th}$ step is identical with an target tooth arrangement of the $M-1^{th}$ step, and an target tooth arrangement of the $M^{th}$ step is identical with an initial tooth arrangement of the $M+1^{th}$ step, where M is smaller than N.

14. The shell-shaped tooth repositioner of claim 13, wherein the N shell-shaped tooth repositioners are upper jaw repositioners.

15. The shell-shaped tooth repositioner of claim 2, wherein each of the N shell-shaped tooth repositioners is an integral shell.

16. The shell-shaped tooth repositioner of claim 15, wherein among the N successive steps, an initial tooth arrangement of the $M^{th}$ step is identical with an target tooth arrangement of the $M-1^{th}$ step, and an target tooth arrangement of the $M^{th}$ step is identical with an initial tooth arrangement of the $M+1^{th}$ step, where M is smaller than N.

17. The shell-shaped tooth repositioner of claim 16, wherein the N shell-shaped tooth repositioners are upper jaw repositioners.

18. The shell-shaped tooth repositioner of claim 1, wherein each of the N shell-shaped tooth repositioners is an integral shell.

19. The shell-shaped tooth repositioner of claim 18, wherein among the N successive steps, an initial tooth arrangement of the $M^{th}$ step is identical with an target tooth arrangement of the $M-1^{th}$ step, and an target tooth arrangement of the $M^{th}$ step is identical with an initial tooth arrangement of the $M+1^{th}$ step, where M is smaller than N.

20. The shell-shaped tooth repositioner of claim 19, wherein the N shell-shaped tooth repositioners are upper jaw repositioners.

* * * * *